US010656802B2

(12) United States Patent
Martinez et al.

(10) Patent No.: US 10,656,802 B2
(45) Date of Patent: May 19, 2020

(54) USER INTERFACE COMPONENT REGISTRY

(71) Applicant: Microsoft Technology Licensing, LLC, Redmond, WA (US)

(72) Inventors: Diego F. Martinez, Bellevue, WA (US); Savannah K Reiff, Kirkland, WA (US); Matthew P Kopchick, Bellevue, WA (US); Edward A Layne, Seattle, WA (US); Andrey V. Fomichev, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 108 days.

(21) Appl. No.: 15/479,964

(22) Filed: Apr. 5, 2017

(65) Prior Publication Data
US 2018/0292958 A1 Oct. 11, 2018

(51) Int. Cl.
*G06F 9/48* (2006.01)
*G06F 3/0484* (2013.01)
*G06F 3/0482* (2013.01)
*G06F 9/451* (2018.01)
*G06F 9/445* (2018.01)

(52) U.S. Cl.
CPC .......... *G06F 3/0484* (2013.01); *G06F 3/0482* (2013.01); *G06F 9/451* (2018.02); *G06F 3/04845* (2013.01); *G06F 9/44505* (2013.01)

(58) Field of Classification Search
CPC ...... G06F 3/0484; G06F 9/451; G06F 3/0482; G06F 3/04845; G06F 9/44505
See application file for complete search history.

(56) References Cited

U.S. PATENT DOCUMENTS 5,862,377 A * 1/1999 Lee ........................... G06F 9/54
719/313
6,334,157 B1 12/2001 Oppermann et al.
6,404,446 B1 * 6/2002 Bates ..................... G06F 3/0481
715/808

(Continued)

FOREIGN PATENT DOCUMENTS

EP 0622729 A2 * 11/1994 ............... G06F 8/38
EP 0858030 A2 * 8/1998 ............. G06F 9/543

OTHER PUBLICATIONS

"Accessible Event Watcher", https://msdn.microsoft.com/en-us/library/windows/desktop/dd317979(v=vs.85).aspx, Retrieved on: Dec. 29, 2016, 5 pages.

(Continued)

*Primary Examiner* — Jennifer N To
*Assistant Examiner* — K C Chen
(74) *Attorney, Agent, or Firm* — Schwegman Lundberg & Woessner, P.A.

(57) ABSTRACT

Systems, methods, and computer-executable instructions for notifying UI components of state changes of other UI components are disclosed. Operations for notifying UI components can include registering first and second UI components. The second UI component can be associated with the first UI component. A state of the first UI component can be monitored for changes. Once a state change is detected, the second UI component can receive a notification of the state change. The second UI component can then update its state accordingly.

18 Claims, 3 Drawing Sheets

(56) References Cited

U.S. PATENT DOCUMENTS

| | | |
|---|---|---|
| 7,185,078 B2 | 2/2007 | Pleyer et al. |
| 7,194,743 B2 | 3/2007 | Hayton et al. |
| 7,448,042 B1 | 11/2008 | Engber et al. |
| 8,612,806 B2 | 12/2013 | Rossi |
| 9,152,475 B1 | 10/2015 | Kirshenbaum |
| 2003/0011641 A1* | 1/2003 | Totman ............... G06F 3/0482 715/810 |
| 2003/0058286 A1* | 3/2003 | Dando ............... G06F 9/451 715/853 |
| 2004/0064530 A1 | 4/2004 | Sinclair et al. |
| 2009/0125845 A1* | 5/2009 | Lacock ............... G06F 3/0482 715/841 |
| 2009/0327964 A1* | 12/2009 | Mouilleseaux ....... G06F 3/0482 715/834 |
| 2012/0317504 A1 | 12/2012 | Patel et al. |
| 2014/0019890 A1 | 1/2014 | Klinger |

OTHER PUBLICATIONS

"AccessibilityEvent", https://developer.android.com/reference/android/view/accessibility/AccessibilityEvent.html, Retrieved on: Dec. 29, 2016, 42 pages.

"Retrieving Properties from UI Automation Elements", http://web.archive.org/web/20120723111306/http://msdn.microsoft.com/en-us/library/windows/desktop/ee671593(v=vs.85).aspx, Published on: Jul. 23, 2012, 2 pages.

* cited by examiner

USER INTERFACE COMPONENT REGISTRY

BACKGROUND

User interfaces may include a number of user components or elements, such as menus, controls, buttons, windows, etc. While used in various applications, user components can be moved, resized, made visible, made hidden, created, and/or destroyed. In addition, some user components are associated with other user components, such that updating a state of one user component can impact the state of another user component. There is, currently, no easy way to obtain properties, such as position properties, of a user interface (UI) component that is currently displayed on a screen in a UI technology agnostic way. Further, events that affect various UI elements cannot be easily propagated to other UI components or other code. One outcome of this is that UI components, especially those controlled by different code bases, cannot easily react to events. Being unable to react to events makes keeping the UI consistent and in sync with the application and other UI elements difficult.

SUMMARY

This Summary is provided to introduce a selection of concepts in a simplified form that are further described in the Detailed Description. This Summary is not intended to identify key features or essential features of the claimed subject matter, nor is it intended to be used to limit the scope of the claimed invention.

In accordance with one or more aspects, systems, methods, and computer-readable storage mediums that store computer-executable instructions for notifying user interface (UI) components of state changes are disclosed herein. The systems may include a processing unit. The methods may be implemented using a processing unit and the computer-executable instructions may be executed by a processing unit. Operations for notifying UI components can include receiving a request for an anchor registry associated with a parent user interface (UI) window. The anchor registry for the parent UI window can be determined to not yet exist and be created based upon determining the anchor registry does not exist. A first UI component associated with the parent UI window can be registered with the anchor registry. A first anchor identifier is associated with the first UI component. A second UI component associated with the parent UI window can be registered with the anchor registry. A second anchor identifier can be associated with the second UI component. A request to associate the first UI component with the second UI component can be received by the anchor registry. The request can include the first anchor identifier and the second anchor identifier. The second UI component can be registered to receive one or more events associated with the first UI component based upon the request to associate the first UI component with the second UI component. A state of the first UI component can be monitored to detect a state change of the first UI component. One or more UI components that are registered to receive a notification of the state change of the first UI component can be determined. The one or more UI components include the second component. A notification of the state change of the first UI component can be provided to the second component and any other UI component registered to receive notifications regarding the first UI component.

DETAILED DESCRIPTION

Figure 1:
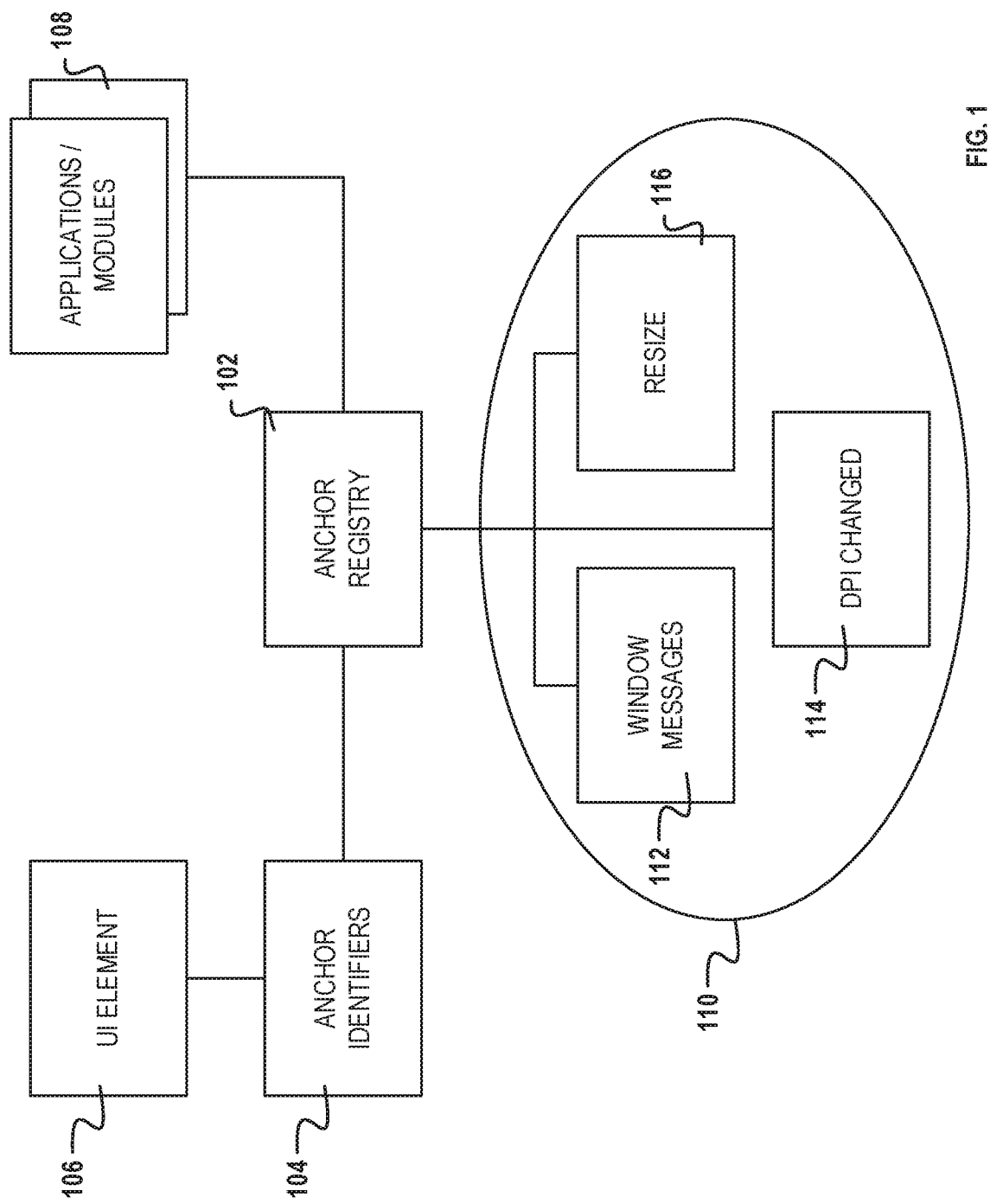
FIG. 1 is a block diagram of a system for using an anchor registry in accordance with respective examples.

In accordance with techniques described herein, UI components are registered with an anchor registry. In some examples, the UI component may register themselves with the anchor registry. In other examples, an application or software module may register the UI component. Once registered, messages and events associated with the UI component can be monitored for state changes related to the UI component. In addition, the UI component can register to receive events associated with other UI components. Events may include an indication that a UI element has moved, has been hidden, has been destroyed, has received or lost focus, etc. The anchor registry provides a generic way for various applications to access positioning and other UI properties of UI components. For example, the anchor registry may keep track of UI components that are anchored to other UI components. In various examples, when a UI component is anchored to a source UI component, the UI component receives messages/events regarding the state of the source UI component via the anchor registry. Thus, the anchor registry ensures that the boundaries of one application or software module are able to be maintained and not breached by other applications and/or modules.

The anchor registry may also act as a messaging platform between UI components. The anchor registry can collect messages from various sources that affect the UI state. These messages can be translated into common messages and associated with one or more UI components. Messages can then be sent to any UI components whose UI state may also change based upon the UI component associated with the message. For example, when a window is moved a message can be generated indicating that a menu item user component has been moved. Another UI component is desired to be located next to the menu item can receive a message that the menu UI component has moved. Using the message, the other UI component can update its location to correctly be next to the menu item.

In an example, the anchor registry may be created based upon static data. In other examples, the anchor registry allows UI components to dynamically register with the anchor registry. This allows for various modules to be able to interact with the UI without having to hard code identifiers in configuration files.

In one example, an application includes a shared UI space and an application UI space. The shared UI space can include buttons, labels, menus, etc. that are available across multiple applications, while the application UI space generally provides application specific UI components. In some examples, the UI components in the shared UI space are not directly accessible by the code that implements the application specific UI components. The anchor registry allows the application specific UI components to be able to determine where a related UI component is located and its state, without having to directly access the shared UI components.

The techniques described herein can be implemented in the general context of computer-executable instructions, such as those included in software-implemented programs, being executed in a computing system on a target real or virtual processor. As an example, such programs may include routines, libraries, objects, classes, components, data structures, etc. that perform particular tasks or implement particular data types. The functionality of the programs may be combined or split between program units as desired in various embodiments. Computer-executable instructions for programs may be executed within a local or distributed computing system. Additionally, the techniques described herein can be implemented in the context of a system, a device, an apparatus, or a like machine. In general, a computing system or computing device can be local or distributed, and can include any combination of special-purpose hardware and/or general-purpose hardware with software implementing the functionality described herein.

FIG. 1 is a block diagram of a system for using an anchor registry 102 in accordance with respective examples. The anchor registry 102 provides an interface to obtain information about one or more UI elements 106. For example, the rectangle that identifies the UI element's position in an outermost window can be exposed via the anchor registry 102. Other examples of information that can be accessed through the anchor registry 102 is which UI element is currently selected/has focus, is a UI element collapsed, is a UI element moving, is a UI element visible, has a UI element been destroyed, etc. For example, when an UI element receives the focus based upon the UI element being selected or the mouse moving over the UI element, the anchor registry may notice this change. Based upon noticing this change, other UI elements registered to receive notifications regarding the UI element are notified that the UI element has received the focus.

The anchor registry 102 provides its interface to one or more applications 108 or modules. For example, an application 108 can be a word processing application. A module can be integrated into the application that provides a plurality of UI elements. In one example, the module can provide a collection of UI elements that make up one or more menus, a ribbon, etc. Both the application and the module can have its own collection of UI elements. Some UI elements from the application may be associated with UI elements from the module and vice versa. For example, the module may have a menu item or button and the application intends to include a pop-up dialog that provides some context information to a user of the application. The application may not know exactly where the menu item or button is located, but still want to anchor the pop-up dialog to the menu item or button. The anchor registry 102 provides an interface for allowing this anchoring without the application directly accessing the module's implementation.

In various examples, an application or module 108 can request the anchor registry 102 for the outermost window. An outermost window is the top level window that contains all UI elements for an application. For example, the outermost window could be the top level window of an application. This allows multiple instances of the same application to have different anchor registries when the multiple instances have different outermost windows. If the anchor registry 102 does not exist, the anchor registry is created.

Continuing with the example above, an application can have multiple UI elements. For example, the application can include a pop-up dialog UI element that the application intends to display next to a menu item UI element that is part of a module that is separate from the application. In various examples, the application 108 can request an anchor identifier 104 of the menu item UI element. In some examples, the menu item UI element has an anchor identifier 104 that is known to the application. The application can pass this anchor identifier to the anchor registry 102. The anchor registry 102 can determine if there is an existing anchor identifier 104 for the requested UI element, e.g., the menu item UI element. If no anchor identifier is found, a new anchor identifier 104 can be created and passed back to the application 108. Otherwise, the known anchor identifier can be passed back to the application 108. The anchor registry 102 maintains a map of anchor identifiers 104 to the corresponding UI element 106.

The application may then register the pop-up dialog UI element to receive events associated with the menu item UI element. In various examples, the application 108 provides the returned anchor identifier of the UI menu item to the anchor registry. In addition, the application 108 can register the pop-up dialog UI element with the anchor registry 102 and provide the anchor identifier of the pop-up dialog UI element to the anchor registry 102 as well to link the pop-up dialog UI element with the menu item UI element.

The anchor registry monitors messages and events 110 from various sources to determine events that can affect the state of UI components. For example, operating system messages, window messages 112, user events, and application messages can monitored. These messages and events can be associated with UI elements. This allows the anchor registry to detect UI changes such as a screen resolution change, a DPI change 114, a window resize, a ribbon resize 116, a window opening, a window closing, a menu opening, a menu closing, etc. In some examples, the anchor registry is able to filter messages based upon the list of anchor identifiers 104. For example, a message that is associated with a UI element but that UI element is not associated with any anchor identifier can be ignored by the anchor registry 102.

The anchor registry maps the messages to one or more appropriate UI elements. Next, the anchor registry determines the anchor identifier associated with the UI element 106 associated with the message or event. The anchor identifiers can then be used to determine the UI elements that are registered to receive events associated with the UI element 106. A message indicating the event is then sent to each listener associated with the UI element 106. The listeners may be part of the registered UI elements or may provide the message to the registered UI elements. A listener provides a standard or known interface that receives the message. The implementation of the listener processes and/or handles the message. In an example, a UI element may implement a listener interface to receive and handle messages from related UI elements. In another example, a listener may receive messages that are then passed to various different UI elements. In this example, the listener maintains a mapping or the relationships between the various different UI elements.

Upon receipt of the message, the registered UI element can take appropriate action. For example, if the source UI element has moved to a new position, the registered UI element's position can be changed accordingly. This allows the application or the UI element itself to reposition itself according to the source UI element's changed position. In one example, the pop-up dialog UI element can move to stay next to the source menu item UI element. Other actions can also occur. For example, the registered UI element may destroy itself or hide itself based upon the state of the source UI element. In some examples, the message includes properties of the source UI element, such as the source UI element's position, visible state, if the source UI element is moving, if the source UI element has focus. As another example, the source UI element's properties may be changed by the application 108 or registered UI element based upon the receipt of the message. For example, a teaching pop-up dialog could highlight the source UI element to visually distinguish the source UI element from other visible UI elements. In an example, highlighting the source UI includes changing the background color of the source UI element. As another example, one or more colors of the registered UI elements may change, leaving colors of the source UI element unchanged. In yet another example, colors of all UI elements, excluding the source UI element, may change. For example, all UI elements may be grayed out, thus, highlighting the unchanged source UI element. The highlighting helps identify the UI element that the pop-dialog is referring to. In other examples, the registered UI element can be a help topic that changes some visual property of the source UI element to spotlight the source UI element.

Figure 2:
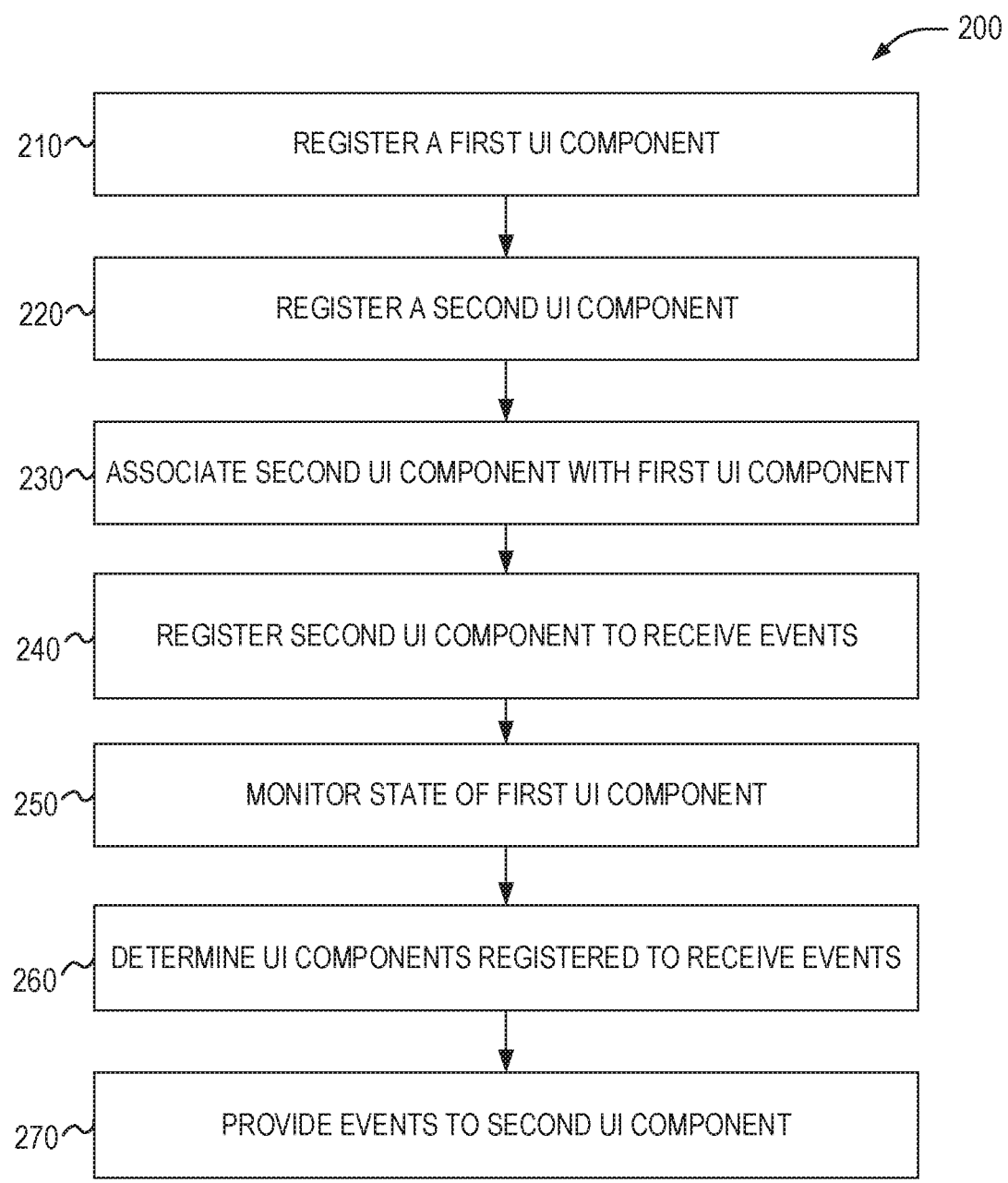
FIG. 2 illustrates a flow diagram of example processes for providing notifications to registered user interface components in accordance with respective examples.

FIG. 2 illustrates a flow diagram of example processes for providing notifications to registered user interface components in accordance with respective examples. The process 200 may start at 210 when an application, module, or UI component registers a first UI component with an anchor registry. In some examples, the anchor registry for an outermost window is requested. If the anchor registry does not exist, an empty anchor registry is created. In some examples, the anchor registry creation may include registering some UI components, such as the outermost window. At 220, a second UI component is registered with the anchor registry.

At 230, the anchor registry receives a request to associate the second UI component with the first UI component. At 240, based on the received request, anchor registry registers the second UI component to receive events/messages related to the first UI component. Registering UI components allows the second UI component to receive messages/events that indicate a UI state of the first UI component. In various examples, the second UI component receives messages/events when one or more properties/states of the first UI component change.

The anchor registry actively monitors various messages. For example, the anchor registry may monitor operating system messages, window messages, and other UI component messages. At 250, the anchor registry analyzes the various messages looking for any state or property change related to the first UI component. When the anchor registry determines that a state or property of the first UI component has changed, any UI component registered to receive events from the first UI component are notified. Events can originate from other sources. For example, events may be at an application or system level. An application is termination or the system is shutting down events are examples of events that do not originate from UI elements. At 260, the anchor registry determines the UI components registered to receive events associated with the first UI component. In the current example, the anchor registry would determine that at least the second UI component is registered to receive events related to the first UI component. In some examples, the anchor registry translates the original message into a common format. This allows the anchor registry to provide consistent messages related to an event regardless of the origin event. At 270, the anchor registry provides notification of the event to the registered UI components, e.g., the second UI component. The notification can be a message or event. In some examples, the message or event includes additional information related to the first UI component. For example, the additional information may include the position of the first UI component, the first UI component's focus state, the first UI component's visibility state, etc. Upon receipt of the message, the second UI component may update its state accordingly as described above.

Figure 3:
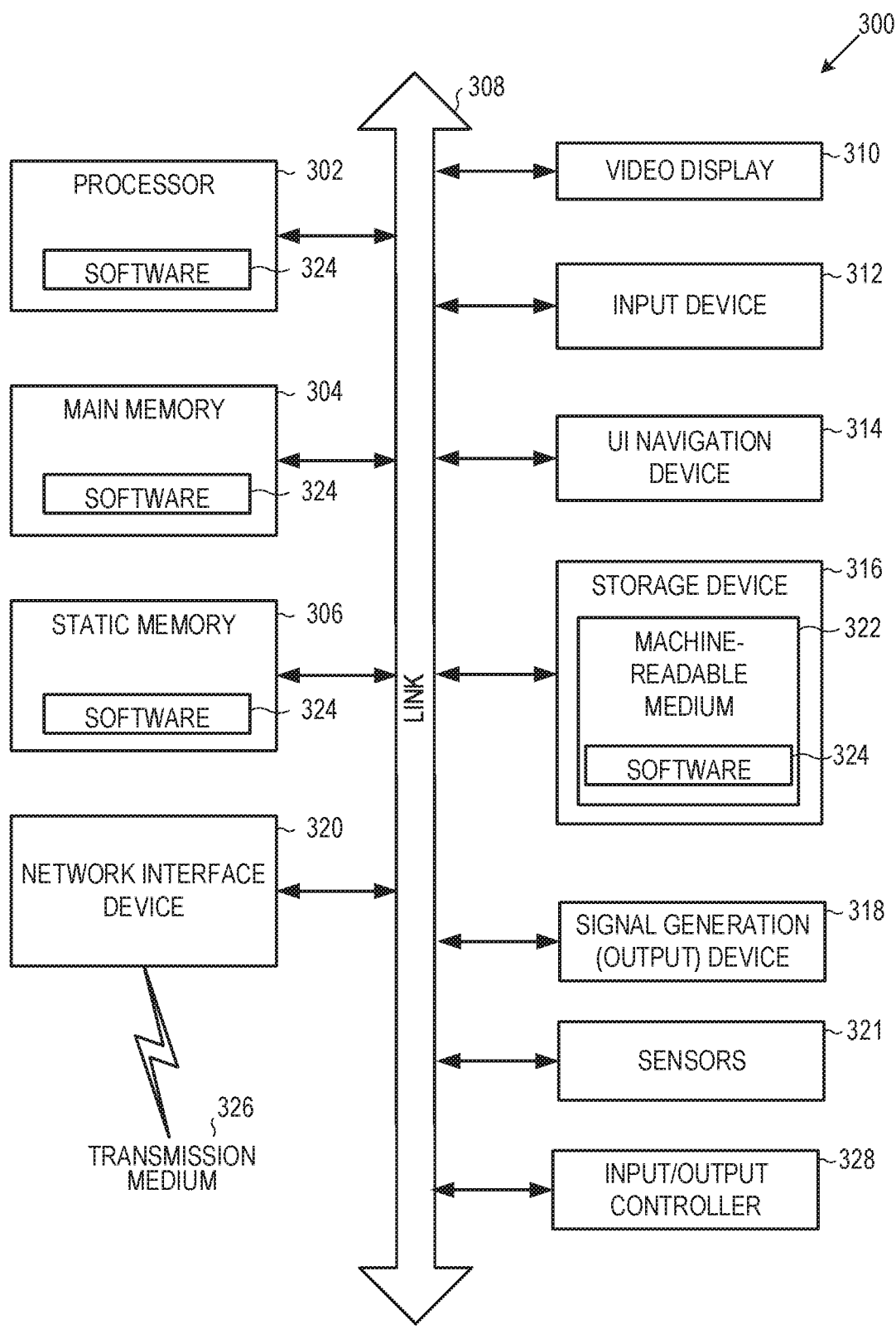
FIG. 3 is an example computing device that can be used in conjunction with the technologies described herein.

FIG. 3 is an example computing device that can be used in conjunction with the technologies described herein. In alternative embodiments, the computing device 300 may operate as a standalone device or may be connected (e.g., networked) to other computing devices. In a networked deployment, the computing device 300 may operate in the capacity of a server communication device, a client communication device, or both in server-client network environments. In an example, the computing device 300 may act as a peer computing device in peer-to-peer (P2P) (or other distributed) network environment. The computing device 300 may be a personal computer (PC), a tablet PC, a set top box (STB), a personal digital assistant (PDA), a mobile telephone, a smart phone, a web appliance, a network router, switch or bridge, or any computing device capable of executing instructions (sequential or otherwise) that specify actions to be taken by that computing device. Further, while only a single computing device is illustrated, the term "computing device" shall also be taken to include any collection of computing devices that individually or jointly execute a set (or multiple sets) of instructions to perform any one or more of the methodologies discussed herein, such as cloud computing, software as a service (SaaS), other computer cluster configurations.

Computing device 300 may include a hardware processor 302 (e.g., a central processing unit (CPU), a graphics processing unit (GPU), a hardware processor core, or any combination thereof), a main memory 304 and a static memory 306, some or all of which may communicate with each other via an interlink (e.g., bus) 308. The computing device 300 may further include a display unit 310, an input device 312 (e.g., a keyboard), and a user interface (UI) navigation device 314 (e.g., a mouse). In an example, the display unit 310, input device 312, and UI navigation device 314 may be a touch screen display. In an example, the input device 312 may include a touchscreen, a microphone, a camera (e.g., a panoramic or high-resolution camera), physical keyboard, trackball, or other input devices.

The computing device 300 may additionally include a storage device (e.g., drive unit) 316, a signal generation device 318 (e.g., a speaker, a projection device, or any other type of information output device), a network interface device 320, and one or more sensors 321, such as a global positioning system (GPS) sensor, compass, accelerometer, motion detector, or other sensor. The computing device 300 may include an input/output controller 328, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.) via one or more input/output ports.

The storage device 316 may include a computing-readable (or machine-readable) storage media 322, on which is stored one or more sets of data structures or instructions 324 (e.g., software) embodying or utilized by any one or more of the techniques or functions described herein. In an example, at least a portion of the software may include an operating system and/or one or more applications (or apps) implementing one or more of the functionalities described herein. The instructions 324 may also reside, completely or at least partially, within the main memory 304, within the static memory 306, and/or within the hardware processor 302 during execution thereof by the computing device 300. In an example, one or any combination of the hardware processor 302, the main memory 304, the static memory 306, or the storage device 316 may constitute computing device (or machine) readable media.

While the computer-readable storage media 322 is illustrated as a single medium, a "computer-readable storage media" or "machine-readable storage media" may include a single medium or multiple media (e.g., a centralized or distributed database, and/or associated caches and servers) configured to store the one or more instructions 324.

In an example, a computer-readable storage media or machine-readable storage media may include any medium that is capable of storing, encoding, or carrying instructions for execution by the computing device 300 and that cause the computing device 300 to perform any one or more of the techniques of the present disclosure, or that is capable of storing, encoding or carrying data structures used by or associated with such instructions. Non-limiting computer-readable storage media examples may include solid-state memories, and optical and magnetic media. Specific examples of computer-readable storage media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and optical media disks. The computer-readable storage media is non-transitory in that the storage media does not consist of transitory propagating signals.

The instructions 324 may further be transmitted or received over a communications network 326 using a transmission medium via the network interface device 320 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.3 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. The network interface device 920 may use the transfer protocols to transmit data using transitory propagating signals.

In an example, the network interface device 320 may include one or more physical jacks (e.g., Ethernet, coaxial, or phone jacks) or one or more antennas to connect to the communications network 326. In an example, the network interface device 320 may include one or more wireless modems, such as a Bluetooth modem, a Wi-Fi modem or one or more modems or transceivers operating under any of the communication standards mentioned herein. In an example, the network interface device 320 may include a plurality of antennas to wirelessly communicate using at least one of single-input multiple-output (SIMO), multiple-input multiple-output (MIMO), or multiple-input single-output (MISO) techniques. In some examples, the network interface device 320 may wirelessly communicate using Multiple User MIMO techniques. In an example, a transmission medium may include any intangible medium that is capable of storing, encoding or carrying instructions for execution by the computing device 300, and includes digital or analog communications signals or like communication media to facilitate communication of such software.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

The above description is intended to be illustrative, and not restrictive. For example, the above-described examples (or one or more aspects thereof) may be used in combination with others. Other embodiments may be used, such as by one of ordinary skill in the art upon reviewing the above description. Further, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

The invention claimed is:

1. A system for notifying user interface (UI) components of state changes, the system comprising:
 a hardware processing unit configured to perform operations comprising:
  receiving a request for an anchor registry associated with a parent user interface (UI) window;
  determining an anchor registry does not exist for the parent UI window;
  creating the anchor registry based upon determining the anchor registry does not exist;
  registering a first user interface (UI) component associated with a parent UI window in the anchor registry, wherein a first anchor identifier is associated with the first UI component;
  receiving a second registration request from a second UI component associated with the parent UI window, wherein a second anchor identifier is associated with the second UI component;
  receiving a request to associate the first UI component with the second UI component, wherein the request comprises the first anchor identifier and the second anchor identifier;
  registering the second UI component, in the anchor registry, to receive one or more events associated with the first UI component based upon the request to associate the first UI component with the second UI component;
  monitoring, in the anchor registry, a state of the first UI component to detect a state change of the first UI component, the state change including a moving or resizing of the first UI component, wherein the first UI component is displayed at a first location, and wherein the state change indicates a location change of the first UI component;
  determining one or more UI components are registered to receive a notification of the state change of the first UI component;
  providing the notification of the state change of the first UI component from the anchor registry to the one or more UI, components, based on the registration of the one or more UI components in the anchor registry, wherein the one or more UI components comprises the second UI component;

determining a second location of the first UI component within the parent UI window, the second location resulting from the moving or resizing of the first UI component based on the location change; and in response to the notification of the state change being provided from the anchor registry to the second UI component, updating a location of the second UI component within the parent UI window from a third location to a fourth location based upon the location change of the first UI component to the second location.

2. The system of claim 1, wherein the first UI component comprises a menu item.

3. The system of claim 2, wherein the second UI component comprises a teaching callout that includes displayed information associated with the first UI component.

4. The system of claim 1, wherein a location of the second UI component is updated based upon the notification.

5. The system of claim 1, wherein the notification comprises the second location of the first UI component.

6. The system of claim 1, wherein the state change includes a focus change of the first UI component.

7. The system of claim 1, wherein the state change indicates the first UI component is no longer visible, and wherein the operations further comprise hiding the second UI component within the parent UI window.

8. The system of claim 1, wherein the parent UI window is an outermost window of an application.

9. The system of claim 1, wherein the operations further comprise determining, at runtime, the first anchor identifier.

10. The system of claim 1, wherein monitoring a state of the first UI component comprising monitoring operation system messages and messages from the parent UI window.

11. The system of claim 1, wherein the operations further comprise highlighting the first UI component.

12. A method, performed by a computing device, for notifying user interface (UI) components of state changes, the method comprising:

receiving a request for an anchor registry associated with a parent user interface (UI) window;

determining an anchor registry does not exist for the parent UI window;

creating the anchor registry based upon determining the anchor registry does not exist;

registering, in the anchor registry, a first UI component associated with the parent UI window, wherein a first anchor identifier is associated with the first UI component;

receiving a second registration request from a second UI component associated with the parent UI window, wherein a second anchor identifier is associated with the second UI component;

receiving a request to associate the first UI component with the second UI component, wherein the request comprises the first anchor identifier and the second anchor identifier;

registering, in the anchor registry, the second UI component to receive one or more events associated with the first UI component based upon the request to associate the first UI component with the second UI component;

monitoring, in the anchor registry, a state of the first UI component to detect a state change of the first UI component, the state change including a moving or resizing of the first UI component, wherein the first UI component is displayed at a first location, and wherein the state change indicates a location change of the first UI component;

determining one or more UI components are registered to receive a notification of the state change of the first UI component;

providing the notification of the state change of the first UI component from the anchor registry to the one or more UI components, based on the registration of the one or more UI components in the anchor registry, wherein the one or more UI components comprises the second UI component;

determining a second location of the first UI component within the parent UI window, the second location resulting from the moving or resizing of the first UI component based on the location change; and in response to the notification of the state change being provided from the anchor registry to the second UI component, updating a location of the second UI component within the parent UI window from a third location to a fourth location based upon the location change of the first UI component to the second location.

13. The method of claim 12, wherein the first UI component comprises a menu item, and wherein the second UI component comprises a teaching callout comprising displayed information associated with the first UI component.

14. A computer-readable storage media storing computer-executable instructions for causing a computing device to notify user interface (UI) components of state changes, the stored instructions comprising:

instructions to receive a request for an anchor registry associated with a parent UI window;

instructions to determine the anchor registry does not exist for the parent UI window;

instructions to create the anchor registry based upon determining the anchor registry does not exist;

instructions to register a first UI component associated with the parent UI window, wherein a first anchor identifier associated with the first UI component;

instructions to receive a second registration request from a second UI component associated with the parent UI window, wherein a second anchor identifier is associated with the second UI component;

instructions to receive a request to associate the first UI component with the second UI component, wherein the request comprises the first anchor identifier and the second anchor identifier;

instructions to register the second UI component to receive one or more events associated with the first UI component based upon the request to associate the first UI component with the second UI component;

instructions to monitor, in the anchor registry, a state of the first UI component to detect a state change of the first UI component, the state change including a moving or resizing of the first UI component, wherein the first UI component is displayed at a first location, and wherein the state change indicates a location change of the first UI component;

instructions to determine one or more UI components are registered to receive a notification of the state change of the first UI component;

instructions to provide the notification of the state change of the first UI component from the anchor registry to the one or more UI components, based on the registration of the one or more UI components in the anchor registry, wherein the one or more UI components comprises the second UI component;

instructions to determine a second location of the first UI component within the parent UI window, the second location resulting from the moving or resizing of the first UI component based on the location change; and instructions to, in response to the notification of the state change being provided from the anchor registry to the second UI component, update a location of the second UI component within the parent UI window from a third location to a fourth location based upon the location change of the first UI component to the second location.

15. The computer-readable storage media of claim 14, wherein the notification comprises the second location of the first UI component.

16. The computer-readable storage media of claim 14, wherein the state change includes a focus change of the first UI component.

17. The computer-readable storage media of claim 14, wherein the state change indicates the first UI component is no longer visible, and wherein the operations further comprise hiding the second UI component within the parent UI window.

18. The computer-readable storage media of claim 14, wherein the parent UI window is an outermost window of an application.

\* \* \* \* \*